Dec. 18, 1956  L. G. GLASSER ET AL  2,774,276
COLORIMETER

Filed Aug. 28, 1951  3 Sheets-Sheet 1

INVENTORS:
LEO G. GLASSER and
DANIEL J. TROY, JR.
BY Harry J. McCauley
ATTORNEY.

Dec. 18, 1956  L. G. GLASSER ET AL  2,774,276
COLORIMETER
Filed Aug. 28, 1951.  3 Sheets-Sheet 2
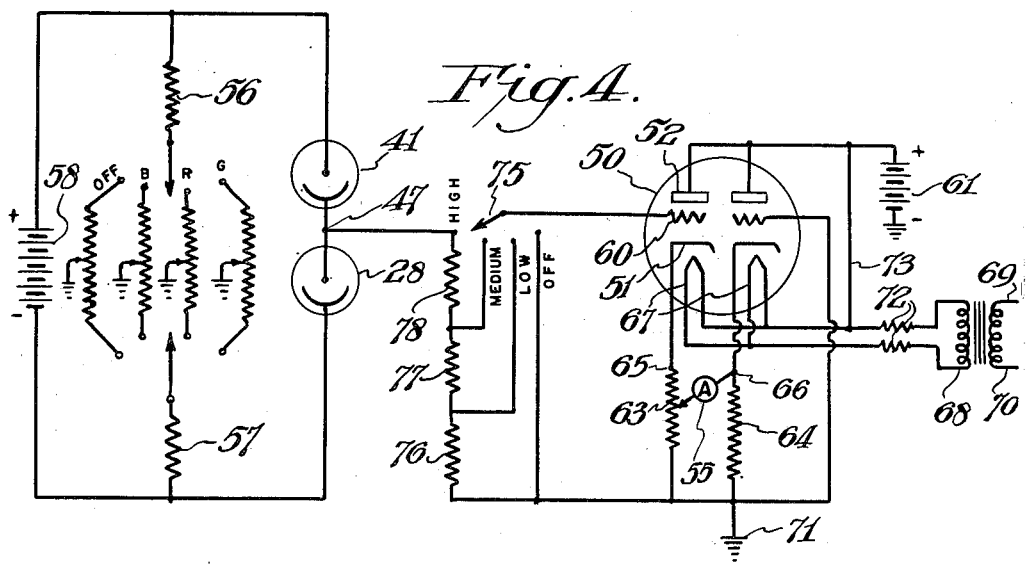
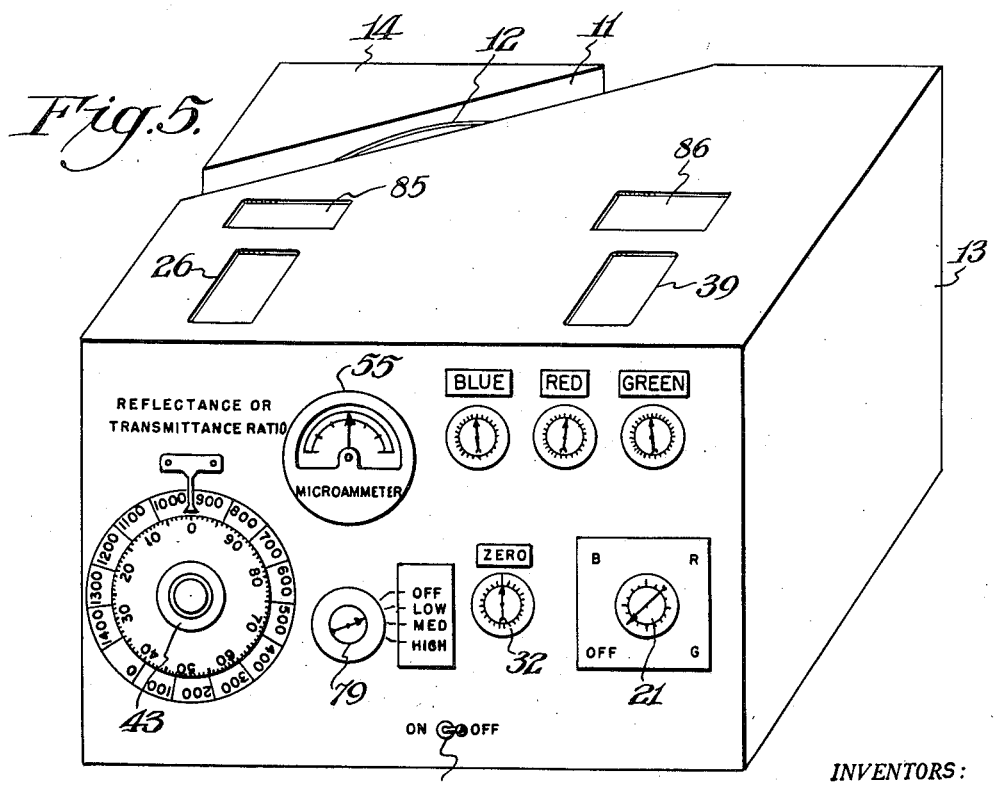
INVENTORS:
LEO G. GLASSER and
DANIEL J. TROY, JR.
BY
*Harry J. McCauley*
ATTORNEY.

United States Patent Office 2,774,276
Patented Dec. 18, 1956

2,774,276

COLORIMETER

Leo G. Glasser and Daniel J. Troy, Jr., Wilmington, Del., assignors to E. I. du Pont de Nemours & Company, Wilmington, Del., a corporation of Delaware Application August 28, 1951, Serial No. 243,936

7 Claims. (Cl. 88—14)

This invention relates to colorimeters, and particularly to an improved colorimeter which can be used as a differential instrument for the comparison of one color with another or as an absolute tristimulus colorimeter for the determination of color co-ordinates according to any of the several existing color designation systems.

Color measuring instruments now available to the art may be classified in two main groups: (1) spectrophotometers and (2) tristimulus colorimeters. Devices in the first group possess a rather high sensitivity in the analysis of materials of both high and low reflectance or transmittance but require considerable time for securing individual readings and for calculating the corresponding color co-ordinates and, in addition, are expensive in first cost and require specially trained operators for best results. Devices in the second group are generally lower in first cost and require only short periods of time for individual readings or the calculation of co-ordinates, but are not as sensitive to color difference as the human eye over the full reflectance or transmittance range and, therefore, are seriously limited in usefulness.

It is a principal object of this invention to provide a colorimeter which, when used as either a single or multi-stimulus instrument, possesses a sensitivity several times greater than that possessed by the human eye over substantially the full range of reflectance or transmittance.

It is another object of this invention to provide a colorimeter wherein the light regulator measuring color values has a linear response for all of the different references against which comparison is sought.

Another object of this invention is to provide a colorimeter employing phototubes as the color measuring elements and a ratio circuit for the detection of net phototube response, thus obtaining high sensitivity over the full range of measurement, even for materials of relatively low transmittance or reflectance.

Another object of this invention is to provide a colorimeter which is low in first cost and simple in operation, so that highly precise color determinations may be made by persons having no special skill or experience.

Figure 1:
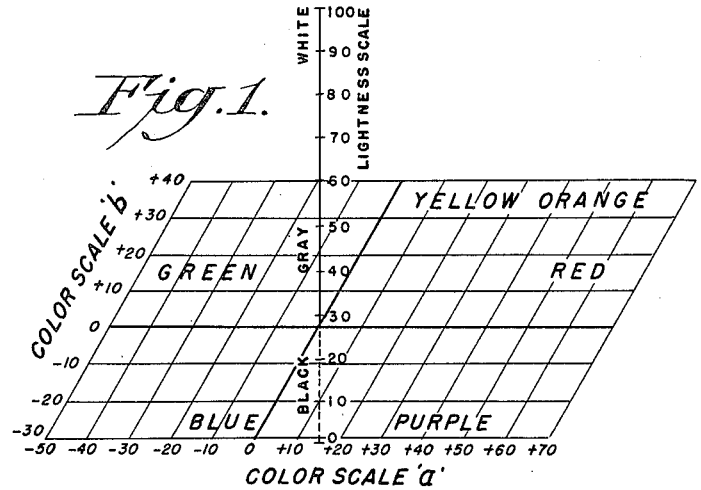
Figure 2:
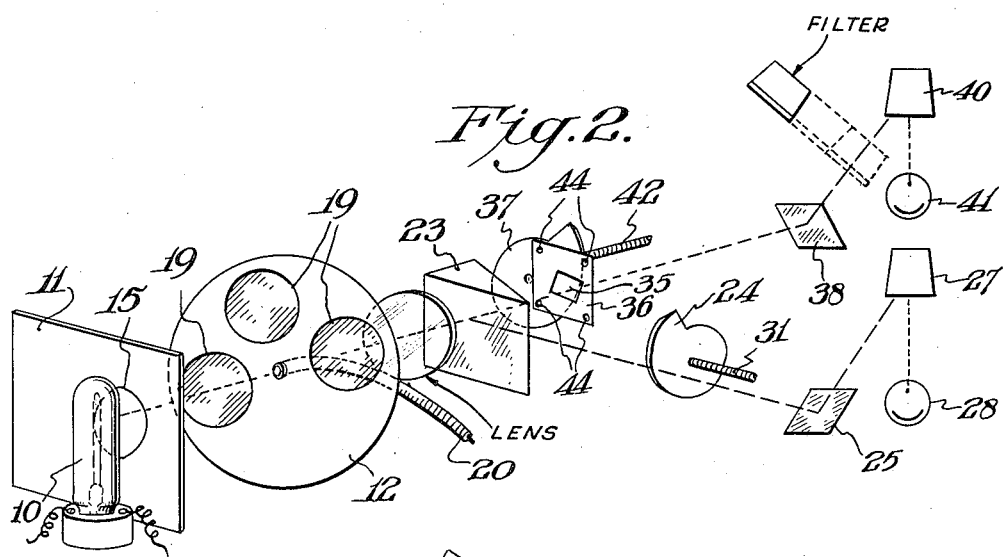
Figure 3:
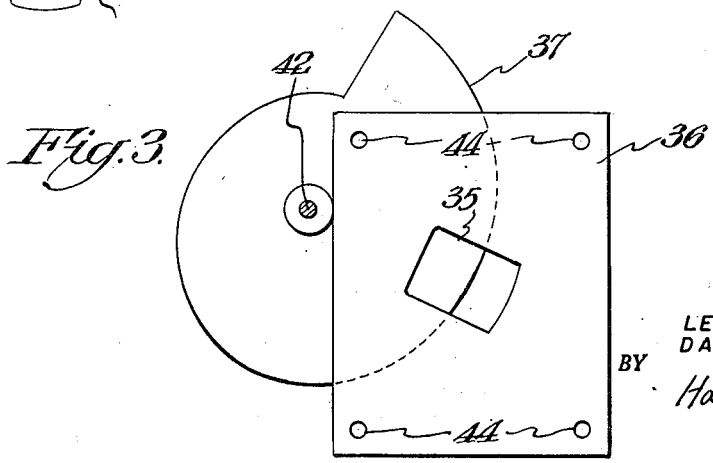
Figure 6:
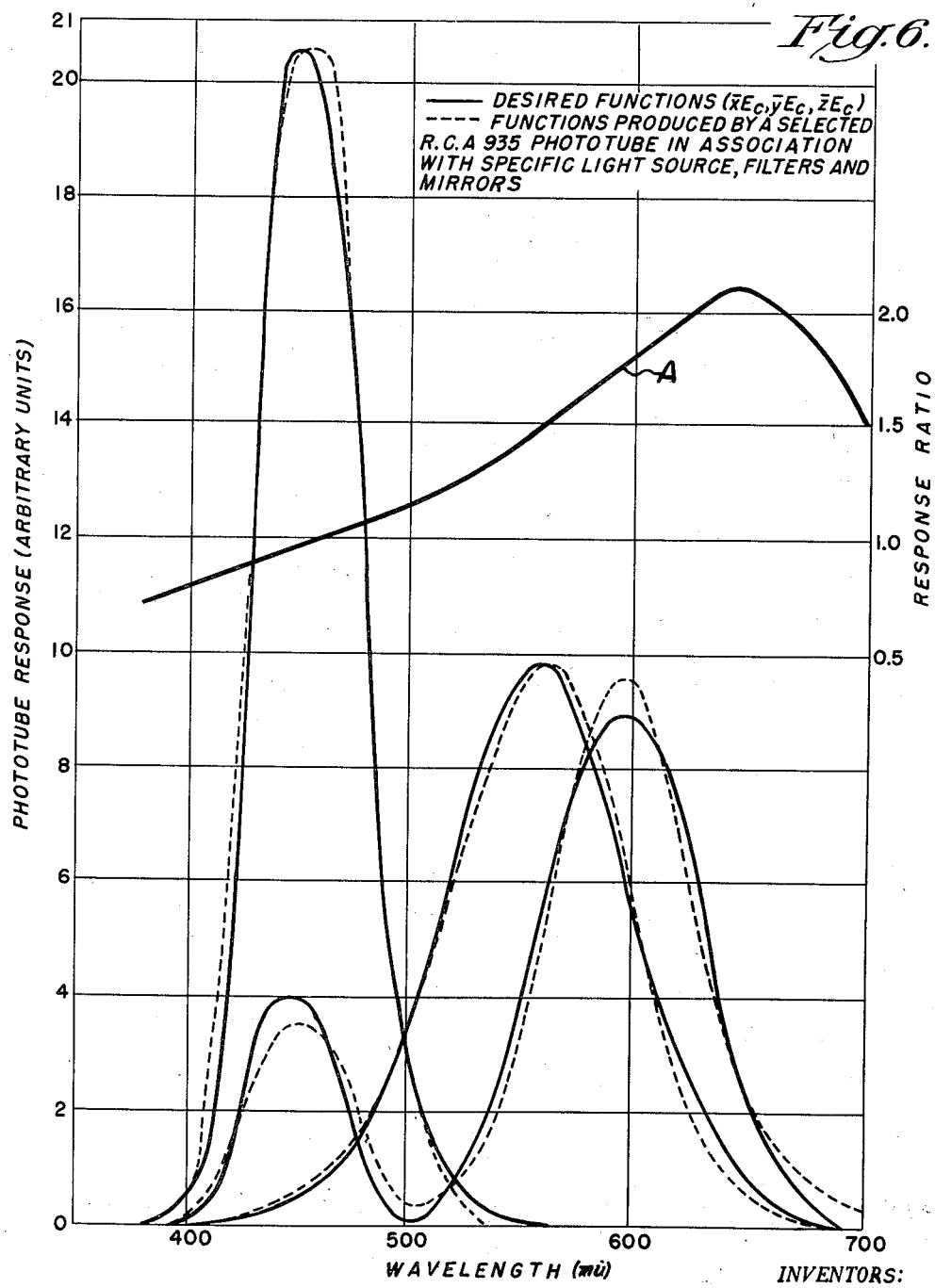

Other objects of this invention will become apparent from the detailed description and the following drawings in which Fig. 1 shows a three-dimensional color diagram for the quantitative expression of color values in National Bureau of Standards units corresponding closely to the gradations which the human eye senses in the visual comparison of a colored sample with a color standard, Fig. 2 is a diagrammatic perspective representation of an arrangement of optical elements in one embodiment of this invention, Fig. 3 is a front elevation view of a preferred design of linearly responsive light regulating device and an associated mask element, Fig. 4 is a diagrammatic representation of the electrical circuit employed in conjunction with the optical system of Fig. 2, Fig. 5 is a perspective front elevation view of a colorimeter according to this invention showing the details of the control panel, Fig. 6 is a graphical representation of satisfactory phototube response for a typical R. C. A. 935 phototube used in conjunction with Corning glass filters and a tungsten light source operating at 3160° K.

Generally, the objects of this invention are attained by providing a light source, a light filter for selectively directing light of a desired color or colors, or wavelength distribution, to the reference and to the sample, and an optically null-balance, ratio-responsive, phototube-bridge photometer. Devices according to this invention are useful as differential colorimeters, wherein measurement of color difference is desired, or as absolute instruments capable of determining absolute color values which may be transformed into color co-ordinates by simple calculations. This invention will be described with particular reference to the measurement of reflectance color values of opaque materials; however, it will be understood that the invention is equally applicable to the measurement of the transmittance color values of transparent materials, and it is intended that the principles herein set forth apply to both of these types of measurement unless otherwise stated.

Referring to Fig. 1, color may be conveniently represented graphically by a plot of three characteristics along three separate rectangular co-ordinate axes in accordance with the Adams chromatic value system, slightly modified. In this representation the vertical lightness scale, hereinafter designated L, may be considered the vertical axis of a color solid containing an infinite number of color planes, each defined by the color scales $a$ and $b$. The particular color plane of Fig. 1 corresponds to a numerical lightness of approximately 27, and at least one color is designated by name in its proper location in each of the four quadrants to correlate the showing with visual perception. Thus, colored samples having progressively greater positive values on the $a$ scale appear progressively more red to the human eye, while samples having progressively greater negative values on the $a$ scale appear progressively more green. Similarly, the positive color scale $b$ locates samples of increasing yellowness, and negative color scale $b$ permits the designation of various gradations of blue. Using a three-dimensional color diagram such as that shown in Fig. 1, colors may be described with certainty by specifying the three numerical values of $a$, $b$ and L. Equal numerical differences for each of the three reference dimensions correspond closely with equal visual color-difference perceptions, thus permitting common use of color experience acquired by visual observation with that acquired through the use of colorimeter instruments.

The colorimeter of this invention was devised to permit the reading of color values convertible by relatively simple mathematical or graphical calculations to vector quantities suitable for plotting on color diagrams of the type shown in Fig. 1. However, it will be understood that color co-ordinate values determined as hereinafter described may be readily transformed to I. C. I., U. C. S., Munsell, or other color designation systems by the use of appropriate graphs or mathematical conversion formulae.

Operation according to this invention involves the measurement of the ratio of the response of the measuring phototube to the response of the reference phototube, namely, $V_M/V_R$, where $V_M$ designates the response of the measuring phototube and $V_R$ the response of the reference phototube.

In general, the response of a phototube, V, equals $\int_0^\infty$ R. S. F. P. $d\lambda$ where, at wavelength $\lambda$, R is the reflectance of the colored material in the light beam (where transmittance is measured, T, the transmissivity, is substituted for R), S is the relative spectral energy emission of the light source, F is the combined spectral transmission of the filters and other optical components in the light path, and P is the sensitivity of the phototube.

The International Commission on Illumination (I. C. I.) defines X, Y and Z as the tristimulus values of a color. By I. C. I. definition, $\Sigma = X + Y + Z$ and $x$, $y$ and $z$, the chromaticity co-ordinates, are equal to $X/\Sigma$, $Y/\Sigma$ and $Z/\Sigma$, respectively.

The tristimulus values of the spectrum colors have the special symbols $\bar{x}$, $\bar{y}$, and $\bar{z}$ and are functions of wavelength. The spectral distribution of average daylight has been defined as a function of wavelength and is given the symbol $E_c$.

The spectral response of a source-filter-phototube combination may be shown by plotting the quantity SFP against $\lambda$. If the ratio SFP/$E_c\bar{y}$ is maintained constant over the full range of variation of $\lambda$, then the phototube response is proportional to the tristimulus value Y of any reflecting or transmitting material interposed in the light beam. By proper choice of filters, phototube responses proportional to X and Z may also be provided.

There are two general methods of color measurement according to this invention: (1) simultaneous comparison and (2) sequential comparison.

In the simultaneous comparison method the colorimeter is first standardized with a pair of identical light-reflecting reference materials, $V_{\text{Reference No. 1}}$ being made equal to $V_{\text{Reference No. 2}}$ by adjustment of the optical and electrical controls hereinafter described, whereupon $$\frac{V_{\text{Reference No. 1}}}{V_{\text{Reference No. 2}}} = 1.000$$

When the samples to be evaluated are substituted for the reference materials, the light influx to one of the phototubes is regulated to achieve balance of the phototube bridge by means of a calibrated reflectance-transmittance control which reads in terms of $$\frac{V_{\text{Sample No. 1}}}{V_{\text{Sample No. 1}}}$$

(or $Y_{\text{Sample No. 1}}/Y_{\text{Sample No. 2}}$, where the ratio of SFP/$E_c\bar{y}$ is maintained constant), or multiples thereof, directly. Similarly, other ratios may be measured depending on the forms of the curves SFP vs. $\lambda$.

In the sequential method of measurement, wherein the spectral response of the reference phototube is in effect cancelled out, only the measuring light beam need be provided with a filter of specified transmission. In this operation the instrument is standardized using the first sample and an arbitrary reference, so that $$\frac{V_{\text{Sample No. 1}}}{V_{\text{Reference}}} = 1.000$$

or $V_{\text{Sample No. 1}} = V_{\text{Reference}}$. Then, when the bridge is balanced with the reflectance-transmittance control when Sample No. 2 is viewed, the ratio $$\frac{V_{\text{Sample No. 2}}}{V_{\text{Reference}}} = \frac{V_{\text{Sample No. 2}}}{V_{\text{Sample No. 1}}}$$

Again, if the ratio SFP/$E_c\bar{y}$ is maintained constant, then $$\frac{V_{\text{Sample No. 2}}}{V_{\text{Sample No. 1}}} = \frac{Y_{\text{Sample No. 2}}}{Y_{\text{Sample No. 1}}}$$

From the foregoing, it will be apparent that if $Y_{\text{Sample No. 1}} = 1.000$, as will be the case when the instrument is standardized against a white magnesium oxide standard, the determined value of $Y_{\text{Sample No. 2}}$ is the absolute luminous apparent reflectance for this sample, thus enabling the direct measurement of absolute color values with the apparatus.

The accuracy of color measurement according to this invention depends on the extent to which the ratio of the product SFP for the phototubes is kept constant with respect to the chosen I. C. I. tristimulus functions $E_c\bar{x}$, $E_c\bar{y}$ and $E_c\bar{z}$ constituting the datum bases. The amplitudes of the SFP curves do not affect the accuracy of the instrument readings, due to the fact that a zero control is provided which adjusts the amplitude to the proper value during standardization. In practice, high accuracy is achieved in all measurements.

A preferred arrangement of optical elements is shown in Fig. 2 and comprises a light source 10 and rotatable color filter disc 12, together with other appurtenances interposed in the two light paths, which are indicated by broken lines. The entire apparatus is housed in a cabinet 13 such as that shown in Fig. 5, with the light source enclosed in a separate corner enclosure 14 to protect the other elements from heat. Filter disc 12 is preferably mounted in the slot between the main cabinet 13 and enclosure 14, where it is in contact with cooling outside air and thus protected against overheating. Wall 11 of enclosure 14 is provided with light port 15 and the adjacent wall of cabinet 13 is also ported to permit entrance of the test light into 13. A slightly convergent lens is desirably mounted in the port of cabinet 13, this lens having a curvature adapted to focus the entering light a distance about 10″ beyond reference port 39. The purpose of this lens is to procure uniform illumination over mask aperture 35, hereinafter described, and, for best results, the lens should be mounted as close to light regulator 37 and light gate 24 as feasible.

Light source 10 may be a 50 watt tungsten filament lamp, which is preferably operated from a constant voltage transformer, such as a Sola type No. 30806. Disc 12 is mounted closely adjacent to the outside wall 11 and the neighboring wall of 13, and the outside surfaces of both walls are coated with black, non-reflective paint to prevent the entrance of outside light into the interior of cabinet 13.

In the tristimulus embodiment of this invention hereinafter described in detail, filter disc 12 is provided with three light filters 19, which may be red, blue and green Corning glass filters having transmissions such that the spectral response of the phototubes closely approximates the tristimulus specifications of Illuminant C, which the International Commission on Illumination (I. C. I.) specifies as a necessary condition for standard observation. For the red filter, Corning glass having a color code number 3304 has proved suitable, while the blue filter may be a two-piece assembly of Corning color code numbers 3389 and 5543. The green filter may comprise a three-piece assembly of Corning glasses having color code numbers 3389, 3307 and 4784. If desired, other filters may be mounted on disc 12 for other types of tristimulus colorimetry, or one or more narrow band pass filters may be employed to determine the reflectance to infrared or ultraviolet light, as may be necessary where the instrument is used as an abridged spectrophotometer, as in the evaluation of camouflage or the determination of the concentration of certain coloring chemicals. Filters 19 are selectively interposed across the testing light beam by turning disc 12 with flexible control shaft 20 (S. S. White Co. catalog 188R73) through the agency of filter control knob 21 mounted on the instrument panel of cabinet 13 (Fig. 5). As will hereinafter be described, light filters of various transmissivities may be interposed directly in front of the two phototubes or elsewhere in one or both of the light beams impinging thereon, and the same or different spectral responses may be maintained for each of the phototubes, depending upon the use to which the instrument is put.

Semi-transparent mirror 23, which may be a Duolux plate glass mirror with a reflectivity of about 25% and a transmittance of about 35%, is employed to split the entering light into two separate beams. In Fig. 2 the reflected light beam is directed to the sample port 26 (Fig. 5) by specular reflection from opaque mirror 25, the angle of impingement on a typical sample of material 27 (Fig. 2) which it is desired to examine being 45°. Phototube 28 viewing sample 27 receives light reflected therefrom along the normal to the sample. Light gate 24 interposed in the sample light beam permits adjustment of the light to maintain equality of total response of the two phototubes when the colorimeter is standardized with light of one color by means of flexible control shaft 31, which is manipulated by the zeroing control knob 32 on the instrument panel (Fig. 5).

The light transmitted by mirror 23 passes through the aperture 35 in mask 36, then past light regulator 37 to opaque mirror 38, from which it is specularly reflected at an angle of 45° through reference port 39 (Fig. 5) to reference 40 (Fig. 2). Phototube 41 viewing reference 40 receives light reflected therefrom along the normal to the reference.

Referring to Fig. 3, mask 36 may comprise a sheet of metal, such as 24 ga. brass, for example, which is provided with port 35, which may be about ⅞" wide and 1" long, with the outer edge disposed along the peripheral edge of regulator 37. The outer edge of port 35 is shaped to conform with the profile of regulator 37 at a reflectance setting of 0.000, so that the light passed to reference 40 will be entirely cut off with the regulator in this position. Light regulator 37 comprises a cam having the shape of a spiral of Archimedes (i. e. the radius decreases uniformly with rotation), a cam decreasing uniformly by an amount of 1.000"±0.002" per revolution being entirely suitable for the purpose. The rear side of the cam, referred to the direction of light travel, is preferably bevelled at an angle of about 45° to provide a sharp edge confronting the light beam. As regulator 37 is turned in a counter-clockwise direction, as viewed in Figs. 2 and 3, the open area of mask 36 uncovered increases linearly, thus increasing the light influx to reference 40 proportionately.

The mask-cam assembly shown in Fig. 2 is represented as being physically removed some distance away from mirror 23 in order to simplify the showing, however, in practice it is preferred to mount these elements closely adjacent the rear side of mirror 23. This can be conveniently accomplished by bolting mask 36 to the mirror supporting frame, holes 44 in mask 36 being provided for this purpose. In the interests of standardizing the construction, light gate 24 may be made identical in design with regulator 37, but no mask is required for the light control effected in the sample light beam.

A mask-cam assembly such as that hereinabove described, having a spiral of radius increasing from 1.25" to 2.25" in a typical case, regulates light transmitted along the reference path linearly. In another case a mask-cam assembly having a spiral of radius increasing from 1.58" to 1.68" was found to be entirely suitable for the regulation of the light in the 85%–100% reflectance or transmittance range. Regulator 37 is turned by flexible control shaft 42 manipulated by the reflectance ratio dial 43 on the instrument panel (Fig. 5). To achieve fine adjustment of regulator position, shaft 42 is preferably coupled to regulator 37 with a reducing worm proportioned so that fifteen turns of the worm are required to turn 37 through its full operating range of 288°. The worm gear, ball bearings and other elements of this adjusting mechanism are preferably spring-loaded to eliminate backlash. Dial 43, registering relative reflectance directly, may then consist of a 15-turn Beckman Duodial or similar device graduated in divisions reading to 0.1% reflectance value.

Referring to Fig. 4, the electrical circuit for the colorimeter of this invention includes a phototube bridge having the vacuum type phototubes 28 and 41 connected in series-aiding relationship, a dual triode electrometer tube 50 for sensing the unbalance of the phototube bridge, and a microammeter 55 for registering the degree and direction of bridge unbalance.

Vacuum phototubes 28 and 41 may be R. C. A. type 935 while electrometer tube 50 may be a 6F8G dual triode amplifier tube. For best results the phototubes should be selected so that their responses approximate closely the I. C. I. $\overline{E_c x}$, $\overline{E_c y}$, and $\overline{E_c z}$ functions, when used with the specific light source, filters, lens and mirrors employed in a particular instrument. The broken line curves of Fig. 6 for the response of a typical R. C. A. 935 phototube, operated with a suitable light source and filters, show a satisfactory match when compared to the values $\overline{E_c x}$, $\overline{E_c y}$ and $\overline{E_c z}$ represented by full lines. In general, phototubes having spectral responses varying by no more than about 10% from these values have proved satisfactory. Except where the instrument is employed in simultaneous comparison operation, a somewhat closer match is desirable in the case of phototube 28, exposed to the measuring light, than for phototube 41, for the reason that reflectance is determined by the phototube in the measuring path. Curve A, with ordinate scale drawn to the right of Fig. 6, represents an especially desirable phototube ratio of sensitivity, referred to the R. C. A. average specification for type 935 phototubes. As indicated by Curve A the relative response to light in the red wavelength region is preferably somewhat higher than the average response over the full range of operation.

Phototubes 28 and 41 are operated in the saturated portions of their voltage-current characteristic curves, preferably at current levels of approximately $10^{-6}$ amperes when exposed to a white reflectance standard. At substantially higher currents, it has been found that the phototubes become unstable, while with lower currents there is some loss of sensitivity in the examination of dark samples. For best stability, variations in the current drawn by the grid of electrometer tube 50 should not exceed about $5 \times 10^{-13}$ amperes when microammeter 55 is brought into balance. To prevent loss of sensitivity to off balance when examining dark samples, it is also necessary to keep the magnitude of the steady grid current low. In practice this current should be less than $5 \times 10^{-11}$ amperes. For the same reason, the resistance between the electrometer grid element and ground should be no less than about 6000 megohms.

Referring to Fig. 4, the resistances in circuit with phototubes 41 and 28 include the fixed value switching elements 56 and 57 and the blue (B), red (R) and green (G) resistances, which are each adjustably tapped to ground. The positions of the grounding taps are adjustable by means of the blue, red and green control knobs on the instrument panel. A fourth adjustable resistance, designated "off" in Fig. 4, is provided to establish a circuit of resistance comparable with the blue, red and green tapped resistances when the latter are disconnected, the tap in the case of the "off" resistance being set initially to an average of the B, R and G resistances and subsequently not altered. The blue, red, green and "off" resistances are preferably placed in circuit with resistances 56 and 57 and phototubes 41 and 28 by conventional individual switches (not shown), which are operated by control shaft 20 from filter control knob 21 as each of the corresponding filters or the blank space of filter disc 12 are moved into the light path.

The phototube bridge circuit is powered by a substantially constant potential direct current source 58, which may be a 90 volt radio B battery or the equivalent.

The electrometer tube 50 of Fig. 4 is preferably of the double triode type shown, enclosed within a common envelope to insure that changes in gas pressure and ambient temperature will affect each section alike and thus obviate diversities in operation caused by environmental differences. Since the current level in the phototube bridge is maintained at relatively low values, the grid of the electrometer tube must draw currents of much smaller magnitude, so as not to affect materially the bridge operation and, in addition, the electrometer tube should be stable over long periods of use and relatively insensitive to voltage fluctuations in its power supply. A type 6F8G dual triode amplifier tube has been found to be a satisfactory electrometer tube for most applications of this invention.

As shown, both triode sections are supplied from a common voltage source 61, which is preferably a 25 v. B battery, and both cathode elements are grounded at 71 through their respective resistors 63 and 64, so that the potential between point 66 and the point in resistor 63 where meter 55 is tapped in will be zero as long as the electrical potential of grid 60 remains at zero level. The two cathode elements of electrometer tube 50 are heated by resistance elements 67 in parallel connection, which are supplied with current from transformer 68 connected to A. C. power leads 69 and 70. For best results it is preferred to maintain the voltage applied to elements 67 at a level of about 4.3 volts, resistances 72 in circuit therewith being proportioned accordingly. Also, to circumvent any possibility of current flow between elements 67 and the plate or cathode elements of electrometer tube 50, conductor 73 is preferably connected between the heaters 67 and the plates, thus making the heater elements always of equal or more positive potential relative to the other elements of the tube. Power switch 80 on the instrument panel is provided for the conjoint control of light source 10 and transformer 68.

Grid 60 is connected in circuit with the phototube bridge by a voltage divider having a switch 75 provided with four contacts: "off," "low," "medium" and "high." As the switch is operated from "off" position to "high" position, resistances 76, 77 and 78 are successively by-passed until, at "high" position, the grid is connected directly with the midpoint of the bridge. Switch 75 is operated by sensitivity selector knob 79 mounted on the instrument panel.

The phototube bridge circuit hereinabove described functions in the manner of a Wheatstone bridge, with the development at midpoint 47 of a characteristic potential of magnitude linearly proportional to the ratio of light quantities passed to phototubes 28 and 41. When this potential is impressed on grid 60 by operation of grid switch 75, a proportional electron current passes between cathode 51 and plate 52, resulting in a potential change in resistor 63 and corresponding movement of the pointer of microammeter 55. The right-hand triode section of electrometer tube 50 provides a reference for comparison with the left-hand triode section, any potential difference across meter 55 being, for all practical purposes, solely the result of changes in potential at midpoint 47, regardless of the absolute potential level which may exist in the electrometer tube circuit due to slight changes in terminal voltage of source 61, or from other causes.

As will become apparent from the following description of the various methods of color determination with the device of this invention, the phototube bridge circuit is standardized initially by first regulating the quantities of light of green illumination passed to each of the phototubes with the zero control knob 32 when a suitable color standard and color reference are placed over ports 26 and 39, respectively. The standardization settings for each of the other test illuminations are then made by adjustment of the grounding taps R and B by manipulation of the red and blue knobs, respectively, on the instrument panel. Bridge balance for both the optical and electrical adjustments is indicated by null balance of microammeter 55. Once the instrument is standardized, the zero, green, red and blue control settings are not altered until restandardization is necessary, which may be conveniently done once each day, or at somewhat more frequent intervals if, owing to sudden large ambient temperature changes, or excessive dust accumulations, the individual circuit components display less stability. The function of the tap connecting resistance 63 through microammeter 55 with point 66 is to equalize the potential when grid 60 is grounded, thus affording stability and making operation independent of fluctuations in the voltage source 61, the temperature or the heater current. The setting of the tap of microammeter 55 with respect to resistor 63 need be altered only when relatively infrequent dissimilar changes in the characteristics of the two triode sections of electrometer tube 50 occur.

With the instrument standardized, color measurements are made by merely adjusting the setting of reflectance ratio dial 43 until null balance of meter 55 is attained at each of the three test illuminations in sequence, employing sensitivity selector knob 79 as an aid in the balancing.

As hereinabove stated there are two general methods of operation to which this invention is particularly adapted, these (1) sequential color comparison, and (2) simultaneous color comparison.

In sequential operation, samples may be compared with an acceptable color standard by determining the ratio of the reflectance, or transmittance, of the former to the latter; or absolute reflectance, or transmittance, may be determined directly if these values are known for the standard employed. Where the nature of the color information sought permits, ratio determinations are preferred for the reason that the calculations required make it possible to use alignment charts and involve only 1- and 2-digit numbers, which are readily processed with a slide rule. Furthermore, ratio determination is somewhat more accurate where dark samples or brilliant colors are to be evaluated. The absolute determination of color coordinates in terms of one of the several currently used systems is somewhat more complicated in that 3- or 4-digit numbers must be manipulated, which generally requires the use of a desk calculating machine. In absolute determinations, the Adams chromatic value system is particularly preferred, because special mathematical tables may be compiled which reduce the calculations required.

In operation by reflectance ratio determination, the instrument is first standardized as follows. With sensitivity selector knob 79 set at "off," a piece of standard material is placed over sample port 26 and another piece of the standard, or a reference material of similar color, is placed over reference port 39. The actual color of the reference material is of no consequence in the color difference measurement so long as it matches the standard sufficiently closely in hue to permit standardization of the instrument. Standardization can be effected when the G, R and B values of the reference are within about ±15% of these values for the standard; however, even wider differences between the reference and the standard can be tolerated at some loss in sensitivity of measurement. Reflectance ratio dial 43 is then set to read 1.000 and the green control knob on the instrument panel is next adjusted to about the middle of its range. Filter control knob 21 is then turned to "G" position and zero control knob 32 is adjusted to regulate the light passed to the standard at port 26 until meter 55 is brought to null balance, sensitivity selector knob 79 being employed in all positions up to and including "high" to effect the utmost precision in this optical adjustment. Meter 55 is next brought to null balance when the switching filter control knob 21 is turned to the "R" and "B" positions successively by adjustment of the red and blue control knobs, respectively, sensitivity selector knob 79 being again utilized for refined adjustment. If the reference material does not closely match the standard, there may be insufficient range of adjustment in the red and blue controls, in which case the initial setting of the green knob may have to be altered in a compensating direction before zero control 32 is brought to its standardized setting, and the other standardizing steps then repeated.

With the instrument standardized, the standard is removed from port 26 and replaced in turn by each of the samples which it is desired to compare with the standard. Reflectance ratio dial 43 is adjusted until meter 55 is brought to null balance for each of the test illuminations in sequence and the corresponding reflectance dial readings, $R_G$, $R_R$, and $R_B$, recorded at the "high" sensitivity setting of 79.

Using a modification of the Adams chromatic value system, color differences may be readily calculated from the reflectance ratio readings in terms of the three co-ordinates describing color by use of the following equations:

$$\Delta a = 4(\Delta L_{R'} - \Delta L)$$
$$\Delta b = 1.6(\Delta L - L_B)$$
$$\Delta L = 70.71 G_s^{1/2}.(R_G - 1).(R_G + 1)^{-1/2}$$

where $$\Delta L_{R'} = 70.71 R'_s{}^{1/2}.(R_{R'} - 1).(R_{R'} + 1)^{-1/2}$$
$$\Delta L_B = 70.71 B_s{}^{1/2}.(R_B - 1).(R_B + 1)^{-1/2}$$
$$R'_s = 0.8 R_s + 0.2 B_s$$
$$R_{R'} = R_R + \frac{B_s}{4R_s + B_s}(R_B - R_R)$$

and the terms $G_s$, $R_s$ and $B_s$ are the three measured values of absolute reflectance of the standard material, which may be determined by the method hereinafter described for absolute color measurement. These latter values need not be determined with a high degree of precision, an accuracy of within 2% being adequate for the evaluation of commercially significant color differences.

From the nature of these equations, it will be understood that alignment charts may be prepared from which the values of $\Delta L$, $\Delta L_R'$ and $\Delta L_B$ corresponding to the magnitudes of the single other variables therein may be conveniently read. The equations for $\Delta a$ and $\Delta b$ may be quickly solved by simple mental or slide rule calculation and addition, or a calculating machine may be used. Where operations require a large number of color comparisons, it is often advantageous to prepare slide rules of special design for computing $\Delta a$ and $\Delta b$ values from $\Delta L$ data.

In the measurement of absolute reflectance by the sequential method, the instrument is first standardized as follows, using Bureau of Standards reflectance standards calibrated for the particular light source and filters utilized. Two similar standards are employed, one being placed over sample port 26 and the other over reference port 39. As in the color difference measurement hereinbefore described, the two standards need only match to within about ±15% in G, R and B values. Reflectance ratio dial 43 is then set at the green (G) calibration of the standard disposed over sample port 26 and the Green control knob is adjusted to mid-range. Then filter control knob 21 is turned to "G" position and meter 55 is brought to null balance by manipulation of zero control 32, using sensitivity control 79 as an aid. Dial 43 is then set at each of the red (R) and blue (B) calibrations of the standard in turn and meter 55 then balanced with the Blue and Red control knobs, respectively, completing the standardization. For most purposes white glass standards are entirely suitable; however, for dark samples having G, R and B values below about 0.150 (15% reflectance) dark standards are desirable. In the latter case, a multiplier setting of reflectance dial 43 during standardization at 10 times the calibration values improves the sensitivity, all reflectance readings for subsequent samples being then multiplied by a factor of 10. Where jet black samples of 0.015 units reflectance or less are to be evaluated, black standards and references are employed and the reflectance dial is set using a multiplier factor of 100, all subsequent reflectance readings on samples being multiplied correspondingly.

Absolute readings of reflectance are made by removing the standard from its position covering port 26 and substituting the samples for which evaluation is desired. Each of the samples is examined under each of the test illuminations in turn in the same manner as described for the ratio method of operation, meter 55 being brought to final null balance at the "high" sensitivity setting of knob 79 by appropriate positioning of reflectance ratio dial 43. The indications of dial 43 at the balanced settings with the green, red and blue filters interposed in the light path are recorded as $G_n$, $R_n$ and $B_n$, respectively, the subscript $n$ identifying the specific sample under examination.

Color co-ordinates in I. C. I. units may be readily calculated from these data, using the following equations:

$$Y = G_n$$
$$x = \frac{(0.816 R_n + 0.184 B_n)}{\Sigma}$$
$$y = \frac{G_n}{\Sigma}$$

where $\Sigma = 0.816 R_n + G_n + 1.365 B_n$.

Since all other color co-ordinate systems have been related to the I. C. I. system, either by graphs or transformation formulas, it will be understood that the I. C. I. co-ordinate values of color or color-difference are easily convertible to the units of the Munsell, U. C. S., or other systems.

Adams chromatic value co-ordinates suitable for plotting in the three-dimensional color diagram of Fig. 1 are determined from the instrument data with the aid of Table II of the Final Report of the Optical Society of America, sub-committee on the spacing of the Munsell colors (authors Sidney M. Newhall, Dorothy Nickerson and Deane B. Judd, published in the Journal of the Optical Society of America, Vol. 33, page 406 (1943)).

The need for calculations or special conversion tables for the determination of chromaticity co-ordinates can be entirely obviated by employing sequential color comparison in a direct-measuring procedure by which the individual values of $x$, $y$, $Y$ and other characteristics can be determined readily.

In this procedure filter wheel 12 is employed but, in place of the red, blue and green filters 19, filters which have spectral response curves matching those for Y, Z and $\Sigma$, respectively, for the illumination employed (usually I. C. I. illuminant "C") when utilized with the phototubes, filters, lamp and other optical components of the specific instrument, are substituted. These filters may be Corning glass or other varieties which approximate the desired spectral responses.

A Z filter is used in this operation instead of an X filter because the latter light region has a rather complicated transmission curve with two major transmission peaks which makes fabrication of a matching filter difficult. To some degree a $\Sigma$ filter resembles an X filter, in that it also possesses two major transmission peaks, the one in the blue region being narrow while the one in the yellow region is relatively broad. This spectral transmission can, however, be roughly approximated with conventional glass and gelatin filters.

Using the Y, Z and $\Sigma$ filters, and identical Bureau of Standards standards over ports 26 and 39, the colorimeter is first standardized by the same procedure hereinabove described for the measurement of absolute reflectance by the method of sequential comparison. The sample for which it is desired to determine $x$, $y$ and Y values is then substituted over port 26 and the value of Y for the sample is determined by the procedure for the determination of absolute reflectance.

At this point the $\Sigma$ filter is again interposed across the light path by turning filter wheel 12 backwards and the zero control is reset to balance the phototube bridge with the Reflectance control set at 1.000. This adjustment has the effect of multiplying all subsequent Reflectance readings by the factor $1/\Sigma$.

With the Y filter again across the light path, the phototube bridge is again rebalanced in the same manner as already described for the determination of Y. Because of the multiplication effected by the reset and rebalance with the Σ filter, the Reflectance dial reading at balance is $$\frac{Y}{\Sigma} = y$$

Similarly, the value of $z$ is directly read by interposing the Z filter across the light path, carrying out the same operation as described for the determination of $y$.

Since $x = 1 - y - z$, this characteristic is determinable by simple subtraction. When a succession of samples is evaluated, it is desirable to reset the Y value determined before the Σ reset-rebalance step by returning the Y filter to position across the light path, adjusting the Reflectance control to the previously recorded value of Y and resetting the Zero control to balance. Thereafter, other samples can be evaluated by the method using the technique described, restandardization once after the examination of each five or ten samples being desirable.

Yet another method of determining absolute chromaticity values utilizes the ratio principle of operation, to which the instrument of this invention is particularly adapted. This method is especially advantageous, since it enables measurements to be made at maximum sensitivity, regardless of the lightness or darkness of the sample. As will be apparent, this technique is analogous to the reflectance ratio determination hereinbefore described under the heading of sequential color comparison.

In this method, a standard of known Y, Z and Σ values, preferably one close in color to the sample to be examined, is placed over sample port 26 and a reference having Y, Z and Σ within ±15% of these values for the standard is placed over reference port 39. As in the immediately preceding example, filter wheel 12 provided with Y, Z and Σ filters is employed for the light regulation. The instrument is then standardized with each filter across the light beam in turn while the Reflectance control is set at 1.000 in the manner hereinabove described for operation by the reflectance ratio determination method. As a next step the sample is substituted for the standard over port 26 but the reference is retained over port 39.

With the Y filter across the light beam, the ratio of $$\frac{Y_{Sample}}{Y_{Standard}}$$

is determined directly by bringing meter 55 to null balance by manipulation of the Reflectance control solely, the standardizing settings of the other controls remaining unaltered.

The Σ filter is then turned into the light beam and, with the Reflectance dial set to 1.000, the Zero control is reset to balance the phototube bridge. This adjustment has the effect of multiplying all subsequent Reflectance readings by the factor $$\frac{\Sigma_{Standard}}{\Sigma}$$

since the quantity $$p \frac{\Sigma}{\Sigma_{Standard}} = 1$$

where $p$ is the scale multiplier introduced by this second standardization, and $$p = \frac{\Sigma_{Standard}}{\Sigma}$$

To determine $$p \frac{Z}{Z_{Standard}} = \frac{Z}{Z_{Standard}} \cdot \frac{\Sigma_{Standard}}{\Sigma} = \frac{Z}{\Sigma} \cdot \frac{\Sigma_{Standard}}{Z_{Standard}} = \frac{z}{z_{Standard}}$$

the Z filter is interposed in the light beam and the bridge rebalanced in the same manner as described hereinabove for the determination of $$\frac{Y_{Sample}}{Y_{Standard}}$$

by manipulating the Reflectance control and reading its final setting.

Similarly, $y/y_{Standard}$ is determined by turning the Y filter across the light beam and balancing the phototube bridge by manipulation of the reflectance control.

Before removing the sample, it is preferred to again interpose the Y filter in the light beam and, with the Reflectance control set to read the ratio $$\frac{Y_{Sample}}{Y_{Standard}}$$

reset the zero control to null balance. In this condition, the colorimeter is ready for the measurement of the ratios of the color co-ordinates of another sample to the same standard.

Absolute values of co-ordinates $z$, $y$ and Y are determined by simply multiplying the measured ratios by the known corresponding values for the standard.

Simultaneous operation in the manner hereinafter described is particularly advantageous in control laboratories where requirements necessitate examination of a number of samples of one general color, followed by examination of samples of other general colors which differ considerably from the first general color as well as from the other general colors. For simultaneous operation it is necessary that the two instrument phototubes be spectrally similar.

When operating according to this method, the instrument is conveniently standardized with a pair of identical light-reflecting spectrally neutral white plates, reflectance ratio dial 43 being set at unity and meter 55 being brought to null balance by adjusting zero control 32 at the green illumination, and then suitably adjusting the Red and Blue controls under the red and blue illuminations, respectively. With the instrument standardized, the colored samples to be compared are substituted for the two white plates, the standard of the pair being positioned over port 39. If the two materials have the same color, meter 55 will continue in balance at unity reading of dial 43. If a color difference exists, the indication of dial 43, when its setting is altered to rebalance 55, constitutes a measure of the ratio of the individual reflectances.

For best accuracy by this method, phototubes 28 and 41 should have an equal response over the entire color range, not merely when viewing the white standardizing chips. Accuracy may be improved by careful selection of phototubes of matched color response, by providing corrective filters in the reference light beam to compensate for deviations existing in particular regions, or by standardizing with colored chips similar to the colors under investigation, all of which will be understood by those skilled in the art.

Where the standard is of such a nature that it will not withstand repeated or prolonged exposure to the testing illuminations without fading, unequal shrinkage or other alterations, the standard may be compared with an arbitrary standard and the latter's resulting color values determined. The samples are then subsequently compared with the arbitrary standard and, by double subtraction, their status with respect to the true standard is readily determinable.

As has been previously stated, the colorimeter of this invention is entirely suited to transmittance measurement as well as to reflectance measurement, methods of operation being identical for both except that, for the former, the transmittance characteristic is of course determined instead of the reflectance characteristic. To adapt the instrument to both reflectance and transmittance measurement, two sets of ports are provided, ports 26 and 39 being employed for reflectance readings while ports 85 and 86 are used for transmittance readings. It will be understood that ports 85 and 86 are kept covered with light excluding metal plates (not shown) when reflectance measurements are being made, while ports 26 and 39 are covered with similar neutral white glass reflecting plates, or magnesium oxide standards for higher accuracy, which redirect the light toward phototubes 28 and 41, when transmittance measurements are made.

In transmittance ratio measurements on fluids, the samples and reference are supported within glass cells having equal light transmitting properties, the cells being preferably interposed normal to the light beams between mirror 25 and port 26, and mirror 38 and port 39, respectively. Where light-translucent solid materials, such as colored cellophane or the like, are the subject of examination, glass cells are not required for the support of samples and standard, but these materials may be interposed across the light beams in suitable frames or other supports.

Absolute transmittance measurements may be conveniently made by any one of the following three methods, whichever is most desirable under the existing circumstances.

(1) The instrument is first standardized with no cells or materials in either beam by setting dial 43 at a reading of 1.000 and bringing meter 55 to null balance with the green, red and blue controls when the corresponding colored filters are interposed before light source 10. With port 86 closed and no standard in this beam, the sample is introduced into port 85 and dial 43 is then manipulated to bring meter 55 to null balance for each of the three filters 19 in turn. The dial readings secured constitute the R, G and B transmittances for the particular sample.

(2) The instrument is first standardized as in (1), except that the standard against which comparison is sought is first introduced into port 85, port 86 remaining empty. The sample is then substituted for the standard and the readings are taken as in (1), when the transmittance ratios $$\frac{R_{Sample}}{R_{Standard}}, \frac{B_{Sample}}{B_{Standard}} \text{ and } \frac{G_{Sample}}{G_{Standard}}$$

are obtained by direct reading. Knowing the absolute values of these characteristics for the standard, the corresponding values for the sample are obtainable by simple calculation.

(3) The instrument is first standardized as in (1). The standard is then placed in port 86 and the sample in port 85, whereupon the readings of dial 43 in null balancing meter 55 under each of the three illuminations in turn yield the same ratios as in (2).

It will also be understood that the various methods of scale multiplication, light quality correction and other techniques described in detail for reflectance measurement are all equally applicable to transmittance determinations.

The colorimeter of this invention is adapted to the measurement of ratios of light intensities, and it is possible with it to multiply and divide these ratios at will by simple, straightforward, mechanical operations. In use, the instrument displays a high degree of constancy of sensitivity over a wide range of light intensities. With it reflectance or transmittance readings precise and reproducible to about 0.02% of the values of the standard are obtainable in the reflectance or transmittance range above about 10%. For blocks of about 1% reflectance or transmittance, the precision attainable is about 0.04% of the standard, whereas for very dark blacks of 0.1% reflectance or transmittance the precision is about 0.4% of standard.

From the foregoing it will be understood that this invention may be modified widely within the skill of the art without departing from its essential spirit, wherefor it is intended to be limited only by the scope of the following claims.

What is claimed is:

1. A colorimeter comprising a light source and in optical alignment therewith a light filter, a convergent lens producing a real image of said light source and a semi-transparent mirror directing the light from said convergent lens along two distinct paths, the first of said two paths being provided with a light regulator having an adjustable control means and a color sample support disposed past said light regulator, the second of said paths being provided with a linear light transmitting mask-light regulator assembly having an adjustment means calibrated so as to permit determination of color values and a reference color support disposed past said mask-light regulator assembly, said convergent lens, said semi-transparent mirror, said light regulator and said mask-light regulator assembly being all disposed in close proximity one to another, a pair of vacuum phototubes, on viewing the sample and the other the reference disposed out of the line of sample and reference specular reflection with respect to said color sample support and said reference color support, connected in a light ratio-responsive series-aiding electrical bridge circuit provided with a direct current voltage source, an electrometer tube having a grid element in electrical connection with said bridge circuit between said phototubes and an associated plate element in circuit with a direct current power source, and an indicating meter in electrical connection with the output side of said electrometer tube adapted to sense the electrical unbalance between said phototubes.

2. A colorimeter comprising a light source and in optical alignment therewith means provided with a multiplicity of individual different colored light filters, a convergent lens producing a real image of said light source and a semi-transparent mirror directing the light from said convergent lens along two distinct paths, the first of said two paths being provided with a light regulator having an adjusting control means and a color sample support disposed past said light regulator, the second of said paths being provided with a linear light transmitting mask-light regulator assembly having an adjustment means calibrated so as to permit determination of color values and a reference color support disposed past said mask-light regulator assembly, said convergent lens, said semi-transparent mirror, said light regulator and said mask-light regulator assembly being all disposed in close proximity one to another, a pair of vacuum phototubes, one viewing the sample and the other the reference disposed out of the line of sample and reference specular reflection with respect to said color sample support and said reference color support, connected in a light ratio-responsive series-aiding electrical bridge circuit provided with a direct current voltage source, resistors corresponding in number to said light filters, said resistors being provided with adjustable grounding taps, switching means selectively interposing a separate one of said resistors in said bridge circuit for each individual one of said light filters, an electrometer tube having a grid element in electrical connection with said bridge circuit between said phototubes and an associated plate element in circuit with a direct current power source, and an indicating meter in electrical connection with the output side of said electrometer tube adapted to sense the electrical unbalance between said phototubes.

3. A colorimeter according to claim 2 provided with means co-ordinating the operation of said switching means with the positioned setting of said means provided with said individual different colored light filters.

4. A colorimeter according to claim 2 wherein said mask-light regulator assembly comprises a rotatable opaque cam element with profile of a shape approximating a single convolution of an Archimedes spiral and a stationary opaque mask element provided with a light-transmitting aperture having straight upper and lower sides disposed parallel to a radius drawn from the center of rotation of said cam element to the middle of the end of said aperture adjacent to the edge of said cam element and wherein the end of said aperture adjacent to the edge of said cam element is congruent with the profile of said cam element at zero light transmission.

5. A colorimeter comprising a light source and in optical alignment therewith means provided with a multiplicity of individual different colored light filters, a convergent lens producing a real image of said light source and a semi-transparent mirror directing the light from said convergent lens along two distinct paths, the first of said two paths being provided with a light regulator having an adjusting control means and a color sample support disposed past said light regulator, the second of said paths being provided with a linear light transmitting mask-light regulator assembly having an adjustment means calibrated so as to permit determination of color values and a reference color support disposed past said mask-light regulator assembly, said convergent lens, said semi-transparent mirror, said light regulator and said mask-light regulator assembly being all disposed in close proximity one to another, a pair of vacuum phototubes, one viewing the sample and the other the reference disposed out of the line of sample and reference specular reflection with respect to said color sample support and said reference color support, connected in a light ratio-responsive series-aiding electrical bridge circuit provided with a direct current voltage source, resistors corresponding in number to said light filters, said resistors being provided with adjustable grounding taps, switching means selectively interposing a separate one of said resistors in said bridge circuit for each individual one of said light filters, an electrometer tube having a grid element in electrical connection with said bridge circuit between said phototubes and an associated plate element in circuit with a direct current power source, an indicating meter in electrical connection with the output side of said electrometer tube adapted to sense the electrical unbalance between said phototubes, and a light transmitting neutral color filter of preselected transmissivity such that color value readings will be multiplied by a preselected factor disposed in said second light path between said semi-transparent mirror and the phototube viewing said reference color.

6. A colorimeter comprising a light source and in optical alignment therewith a tri-color light filter, a convergent lens producing a real image of said light source and a semi-transparent mirror directing the light from said convergent lens along two distinct paths, the first of said two paths being provided with a light regulator having an adjusting control means and a color sample support disposed past said light regulator, the second of said paths being provided with a linear light transmitting mask-light regulator assembly having an adjustment means calibrated so as to permit determination of color values and a reference color support disposed past said mask-light regulator assembly, said convergent lens, said semi-transparent mirror, said light regulator and said mask-light regulator assembly being all disposed in close proximity one to another, a pair of vacuum phototubes, one viewing the sample and the other the reference disposed out of the line of sample and reference specular reflection with respect to said color sample support and said reference color support, connected in a light ratio-responsive series-aiding electrical bridge circuit provided with a direct current voltage source, at least the sample viewing phototube of said pair having a spectral response for each of the three illuminations passed by said tri-color light filter differing not more than about 10% from the I. C. I. tristimulus specification for I. C. I. Illuminant C, three resistors provided with adjustable grounding taps, switching means selectively interposing a separate one of said resistors in said bridge circuit for each of the three individual illuminations passed by said tri-color light filter, an electrometer tube having a grid element in electrical connection with said bridge circuit between said phototubes and an associated plate element in circuit with a direct current power source, and an indicating meter in electrical connection with the output side of said electrometer tube adapted to sense the electrical unbalance between said phototubes.

7. A colorimeter comprising a light source and in optical alignment therewith a tri-color light filter, a convergent lens producing a real image of said light source and a semi-transparent mirror directing the light from said convergent lens along two distinct paths, the first of said two paths being provided with a light regulator having an adjusting control means and a color sample support disposed past said light regulator, the second of said paths being provided with a linear light transmitting mask-light regulator assembly having an adjustment means calibrated so as to permit determination of color values and a reference color support disposed past said mask-light regulator assembly, said convergent lens, said semi-transparent mirror, said light regulator and said mask-light regulator assembly being all disposed in close proximity one to another, a pair of vacuum phototubes, one viewing the sample and the other the reference disposed out of the line of sample and reference specular reflection with respect to said color sample support and said reference color support, connected in a light ratio-responsive series-aiding electrical bridge circuit provided with a direct current voltage source, at least said first light path being provided with a light-transmitting color filter disposed ahead of the phototube viewing color material in said path adapted to give a spectral response of the corresponding phototube at each of the three illuminations not differing more than about 10% from the I. C. I. tristimulus specification for I. C. I. Illuminant C, three resistors provided with adjustable grounding taps, switching means selectively interposing a separate one of said resistors in said bridge circuit for each of the three individual illuminations passed by said tri-color light filter, an electrometer tube having a grid element in electrical connection with said bridge circuit between said phototubes and an associated plate element in circuit with a direct current power source, and an indicating meter in electrical connection with the output side of said electrometer tube adapted to sense the electrical unbalance between said phototubes.

References Cited in the file of this patent

UNITED STATES PATENTS

| | | |
|---|---|---|
| 2,247,805 | Faus | July 1, 1941 |
| 2,260,702 | Collins | Oct. 28, 1941 |
| 2,350,001 | Van den Akker | May 30, 1944 |
| 2,382,439 | Osborn | Aug. 14, 1945 |
| 2,406,166 | Scott | Aug. 20, 1946 |

OTHER REFERENCES

Publication by Deeter: "Electronics," September 1938, pages 18 and 19.

Publication by Keating: Radio News, August 1943, pages 41, 50 and 54, "How color comparators work."

Publication by Shurkus: Radio News, June 1944, pages 25–27, 56, 58, 60 and 71.